(12) United States Patent
Cheron et al.

(10) Patent No.: US 6,547,427 B1
(45) Date of Patent: Apr. 15, 2003

(54) OPTICAL SYSTEM FOR MOTOR VEHICLE

(75) Inventors: Hugues Cheron, Bourg Saint-Christophe (FR); Arnold Fayt, Grenoble (FR); Fabien Delwal, Bourg-en-Bresse (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 09/509,458

(22) PCT Filed: Jul. 30, 1999

(86) PCT No.: PCT/FR99/01896

§ 371 (c)(1),
(2), (4) Date: Jun. 22, 2000

(87) PCT Pub. No.: WO00/07844

PCT Pub. Date: Feb. 17, 2000

(30) Foreign Application Priority Data

Jul. 31, 1998 (FR) .............................................. 98 09893
Oct. 27, 1998 (FR) .............................................. 98 13433
Nov. 6, 1998 (FR) .............................................. 98 14014

(51) Int. Cl.⁷ ................................................. B60Q 3/00
(52) U.S. Cl. ...................... 362/507; 362/369; 362/390; 362/523; 362/528
(58) Field of Search ................................. 362/507, 505, 362/546, 374, 375, 369, 390, 523, 528, 267, 269, 368

(56) References Cited

U.S. PATENT DOCUMENTS

| | | | | | |
|---|---|---|---|---|---|
| 4,475,148 | A | * | 10/1984 | Tomforde | ................... 362/269 |
| 5,288,117 | A | * | 2/1994 | Vogelgesang | ............... 293/117 |
| 5,556,190 | A | * | 9/1996 | Saijo | ........................... 362/368 |
| 6,190,030 | B1 | * | 2/2001 | Chase | ......................... 362/507 |

FOREIGN PATENT DOCUMENTS

| | | |
|---|---|---|
| DE | 38 02 104 A1 | 8/1989 |
| DE | 196 15 026 A1 | 10/1996 |
| DE | 195 19 655 A1 | 12/1996 |
| EP | 0 620 137 A1 | 10/1994 |

* cited by examiner

*Primary Examiner*—Sandra O'Shea
*Assistant Examiner*—Guiyoung Lee

(57) ABSTRACT

The invention relates to a lighting system for a motor vehicle, said lighting system comprising a frame (20) suitable for supporting at least one lighting lamp (4, 5), a housing containing the frame and its lamp, and a structural piece (3) of the vehicle, which piece is suitable internally for supporting parts of the vehicle, and externally for supporting elements of the bodywork of the vehicle. The housing is an integral part of the structural piece (3), which, for this purpose, is provided with a bowl-shaped recess that can receive the frame and its lamp directly.

35 Claims, 20 Drawing Sheets

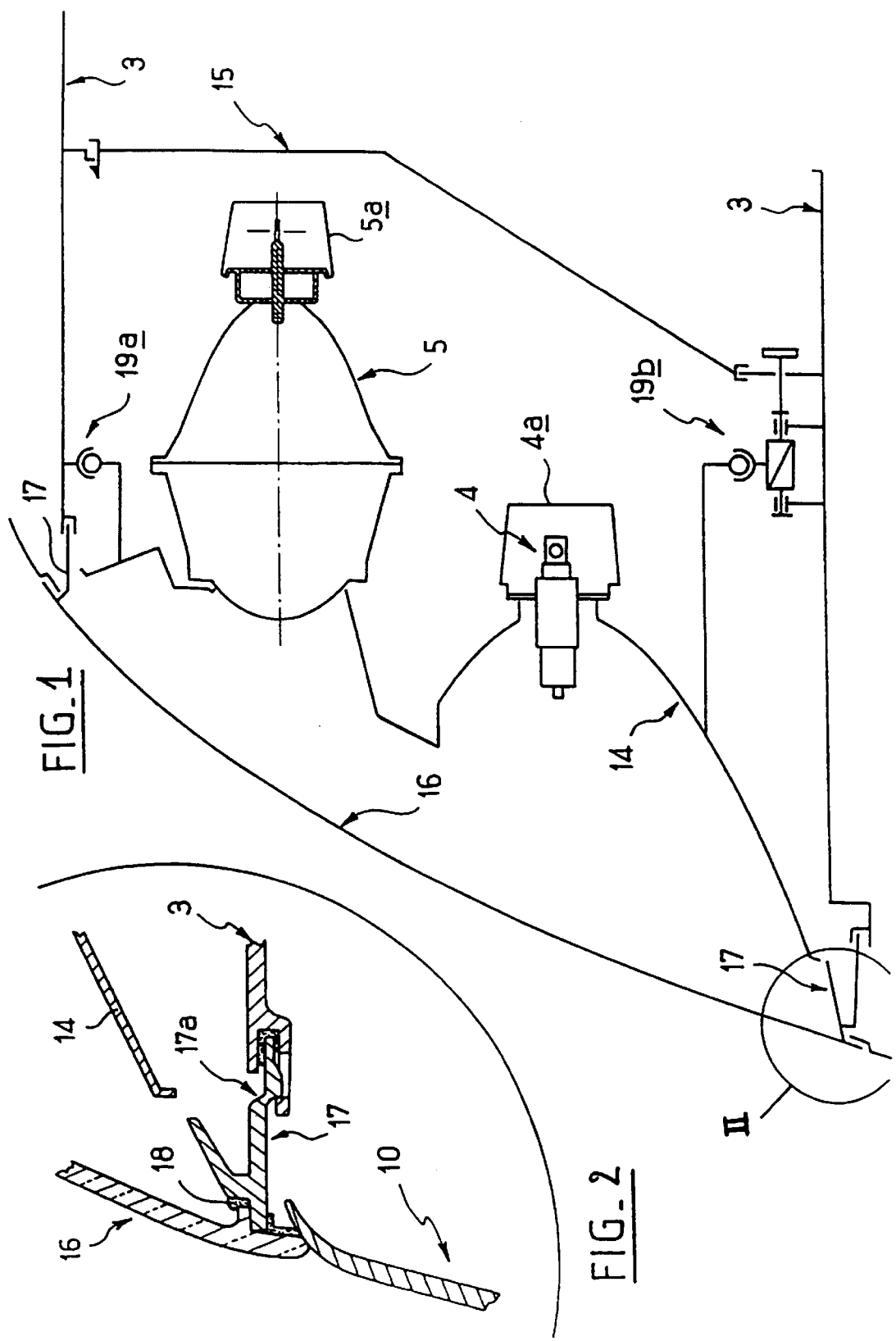

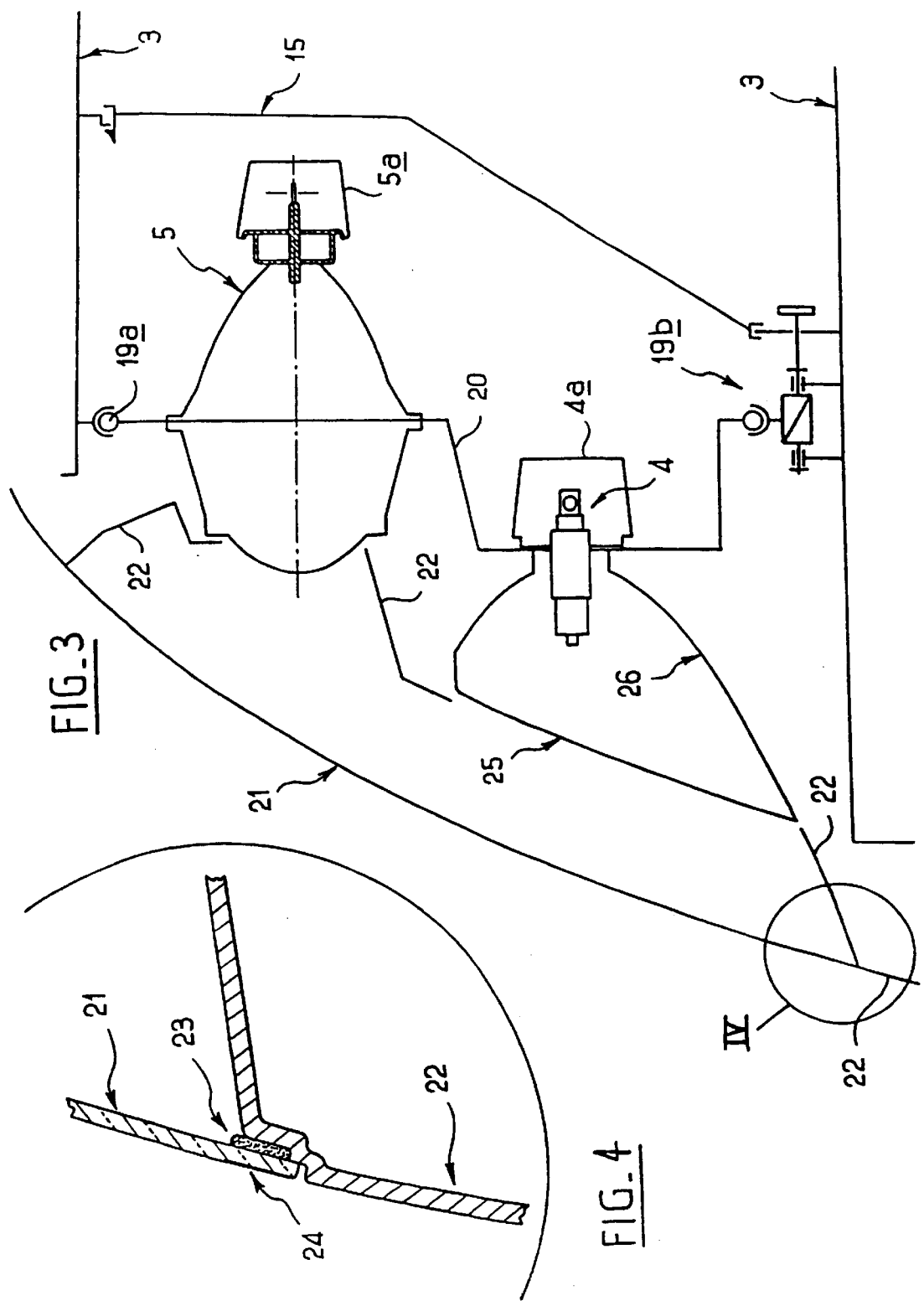

FIG_6

FIG_12

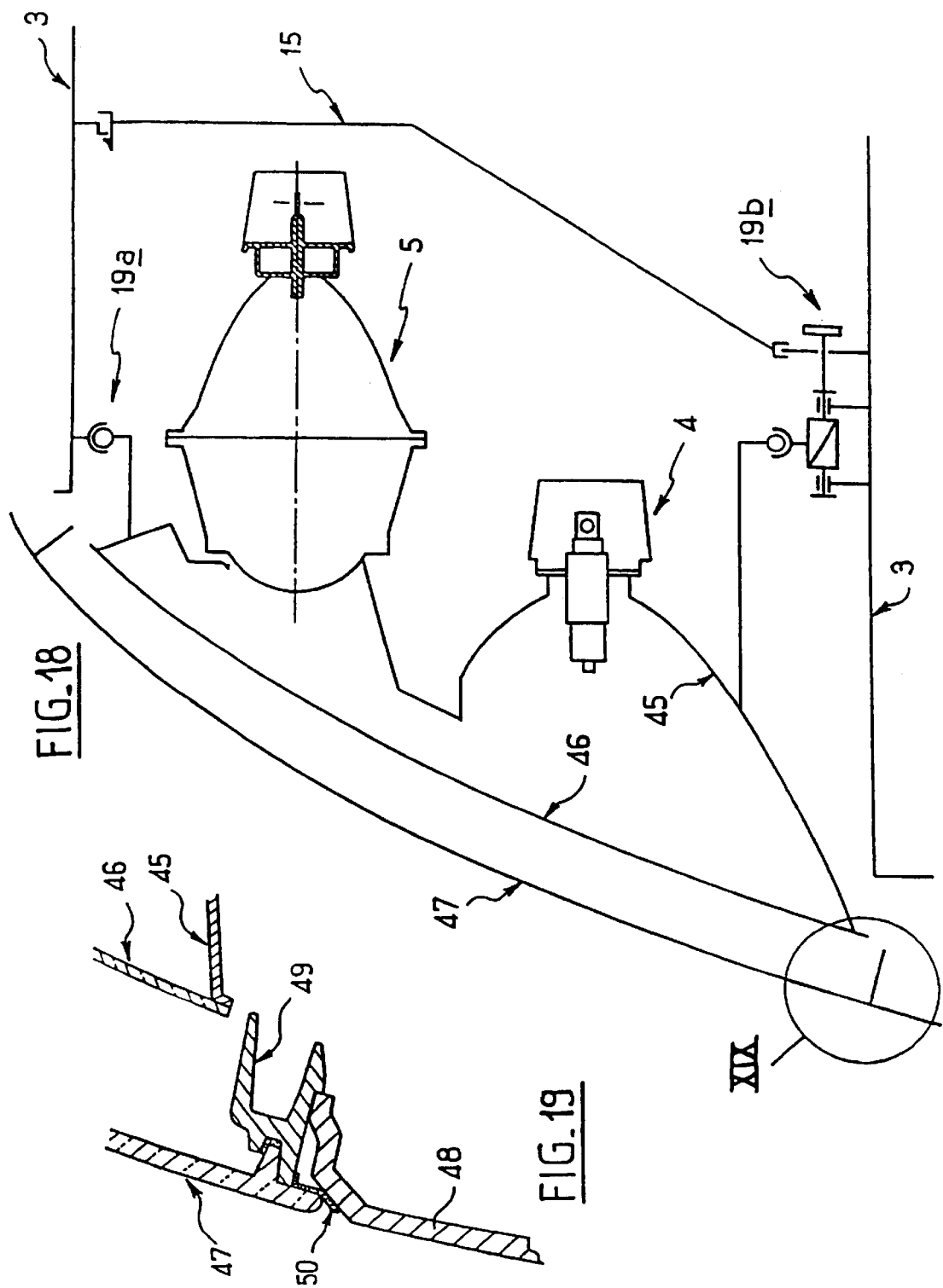

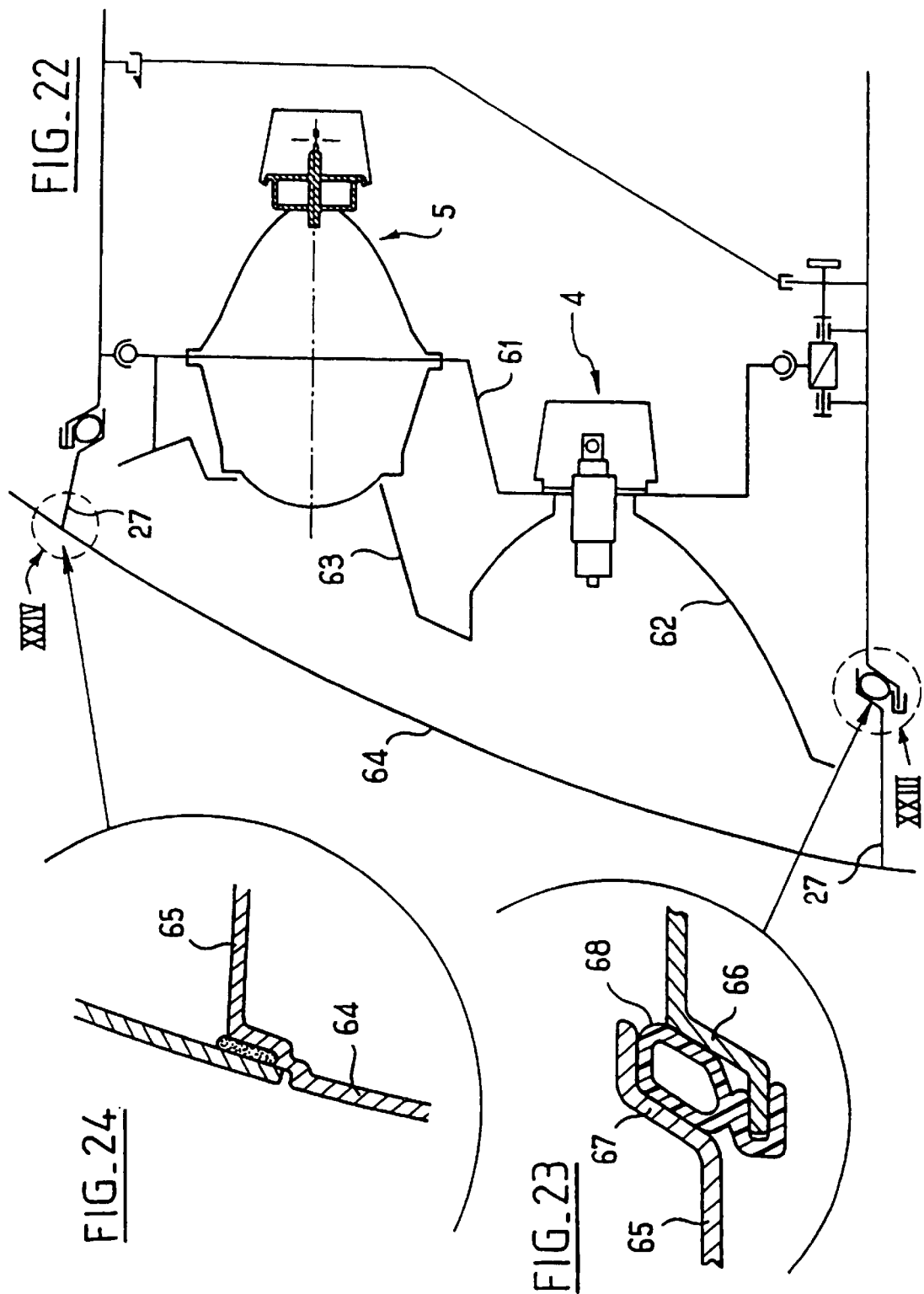

OPTICAL SYSTEM FOR MOTOR VEHICLE

The present invention relates to a light system for a motor vehicle.

It is known that motor vehicle lights are parts that are costly and that are particularly vulnerable to impacts because of their locations on vehicles.

That drawback is due to two factors inherent in currently-used lights.

Firstly, such lights are constituted by self-contained units comprising a housing, a frame, one or more lamps mounted on the frame, and a cover glass placed in front of the lamps to close off the frame. Such self-contained units are mounted on the vehicle without any consideration being given to their own capability of deforming, when their surroundings deform. As a result, under certain circumstances, vehicle lights do not withstand the dimensional variations of their close surroundings, even when such variations are small, and so they break quite easily.

Secondly, since their structure is independent from their operating surroundings, motor vehicle lights cannot enjoy any complementarity with the pieces that surround them.

An object of the present invention is to provide a light system that is simple and low-cost, and that solves those problems in particular, as well as other problems that appear in the description below.

The present invention provides a lighting system for a motor vehicle, said lighting system comprising a frame suitable for supporting at least one lighting lamp, a housing containing the frame and its lamp, and a structural piece of the vehicle, which is suitable internally for supporting parts of the vehicle, and externally for supporting elements of the bodywork of the vehicle, said lighting system being characterized by the fact that the housing is an integral part of the structural piece, which, for this purpose, is provided with a bowl-shaped recess that can receive the frame and its lamp directly.

In a particular embodiment of the invention, the structural piece is a front quarter [quart-avant], as defined in French Patent Application FR-2 754 235.

Preferably, the structural piece is a structural node of the vehicle, i.e. it belongs to the overall framework of the vehicle.

Thus, the structural piece may interconnect an upper longitudinal member, a lower longitudinal member, the bumper crosspiece, and the upper crosspiece which supports the lock and the stop or the hinge of the hood.

In a first embodiment of the invention, the frame supporting the lamp(s) is constituted by a reflective dish which concentrates light rays coming from the lamps.

In a second embodiment, the frame is reduced to a single plate which may optionally support a reflective dish for concentrating the light rays.

The plate is preferably integrally molded, which improves its reliability and its strength, and prevents play from appearing, which could cause the proper setting of the lamps relative to one another to be lost.

In another particular embodiment of the invention, between the bowl-shaped recess and the bodywork, or between the bowl-shaped recess and a protective cover glass placed in front of the frame supporting the lamp, the lighting system includes sealing means which prevent dust, water, and any foreign particles from penetrating into the bowl-shaped recess.

In a first variant, the sealing means are constituted by a compressible gasket of the flexible tube type positioned at the periphery of the front edge of the bowl, and bearing against the bodywork or against the cover glass.

In a second variant, the sealing means are constituted by a bellows which encloses the front edge of the bowl-shaped recess and extends said recess to the bodywork or to the cover glass, against which the bellows abuts.

In the same embodiment, it is advantageous for the bowl-shaped recess to be sealed relative to the outside of the vehicle by means of a molded block of foam which prevents dust, water, and foreign particles from penetrating, while allowing air to flow through, which is essential given the considerable temperature variations that arise in the vicinity of the lighting system.

The block of foam may also provide an energy-absorption function, in particular for impacts with pedestrians.

The block of foam may be situated under the bowl-shaped recess or around said recess.

In a particular embodiment of the invention, the frame is mounted on a structural piece via self-releasing fastenings which, in the event that the vehicle is subjected to an impact, are suitable for releasing the frame so as to allow it to retreat, thereby protecting it from the stresses resulting from the impact and that could damage it.

In a particular variant of this embodiment, the self-releasing fastenings are constituted by snap-fastening means.

Such snap-fastening means offer the advantages of facilitating mounting the frame during vehicle assembly, of being of low cost to manufacture and to assemble, and of making it possible, when the frame retreats, to put said frame back in place without it being necessary to replace the fastening means.

The frame of the lighting system is provided with setting means which make it possible to set the elevation and the azimuth of the light beams coming from the lamps.

For this purpose, the frame may be mounted on pivot-mountings or ball-mountings.

In a preferred embodiment, the frame is provided with two ball-fastenings, one of which is fixed, while the other is mounted to move forwards and backwards, thereby enabling the frame to be pivoted about a vertical axis to set the azimuth of the light beams coming from the lamps, while the elevation can be set by pivoting the frame about a substantially horizontal axis passing through both of its ball-fastenings.

By choosing ball-fastenings in which the male portions and the female portions of said fastenings snap-fasten together, it is possible to obtain simultaneously not only the setting means, but also fastenings that are self-releasing as defined in the preceding embodiment.

For cost reasons, it is advantageous for the fastenings for fixing the frame to the structural piece to be standardized so that various frames can be mounted on various structural pieces. In addition, such standardization can make it possible for an entire family of vehicles to have the same frames, inserted into different structural pieces.

The frame of the lighting system of the invention is preferably organized to receive at least two lamps.

Since the two lamps are secured together via the frame, it is possible to provide a single setting system for the entire light unit.

In a particular embodiment of the invention, the lighting system includes a protective cover glass separated from the frame and secured to the bodywork or to the structural piece, in front of the frame supporting the lamps.

This embodiment offers the advantage that, in the event that the vehicle undergoes an impact, if the cover glass protecting the lamps of the lighting system is damaged, it can be replaced independently from the remainder of the lighting system, which is economically advantageous.

In addition, by fixing the cover glass to the bodywork directly, e.g. by adhesive, it is possible to obtain zero-clearance docking, which imparts a better finish to the bodywork, and does so at lower cost.

When adhesive is used, sealing of the lighting system relative to the outside environment of the vehicle is obtained simultaneously.

In addition, separating the cover glass from the support of the lighting lamps offers new design possibilities as regards the shape and disposition of the lights, in harmony with the shape and style of the bodywork of the vehicle.

In a particular embodiment, the cover glass is secured to the bodywork or to the structural piece via an intermediate piece which includes a self-releasing portion which makes it possible, in the event of impact, for the cover glass to retreat by destroying said intermediate piece.

In another particular variant, the cover glass is provided with snap-fastening shapes which co-operate with corresponding shapes on the bodywork, enabling the cover glass to be snap-fastened to the bodywork.

Thus, the cover glass can be put in place quickly and held firmly by snap-fastening shapes that are particularly robust because they are integrally molded with the cover glass.

In addition, this fixing mode offers the advantage of being disassemblable.

For the purpose of making the invention better understood, embodiments given by way of non-limiting examples are described below with reference to the accompanying drawings, in which:

FIG. 1 is a section through a first embodiment of a light system of the invention on a vertical plane parallel to the direction in which the vehicle advances;

FIG. 2 is a view of the detail II of FIG. 1;

FIG. 3 is a view analogous to FIG. 1, showing another embodiment of the invention;

FIG. 4 is a view of the detail IV of FIG. 3;

FIG. 18 is a view analogous to FIGS. 1 and 3, showing another embodiment of the invention;

FIG. 19 is a view of the detail XIX of FIG. 18;

FIG. 22 is a view analogous to FIGS. 1, 3, and 18 of another embodiment of the invention;

FIG. 23 is a view on a larger scale of the portion XXIII of FIG. 22;

FIG. 24 is a view on a larger scale of the portion XXIV of FIG. 22;

Figure 1A:
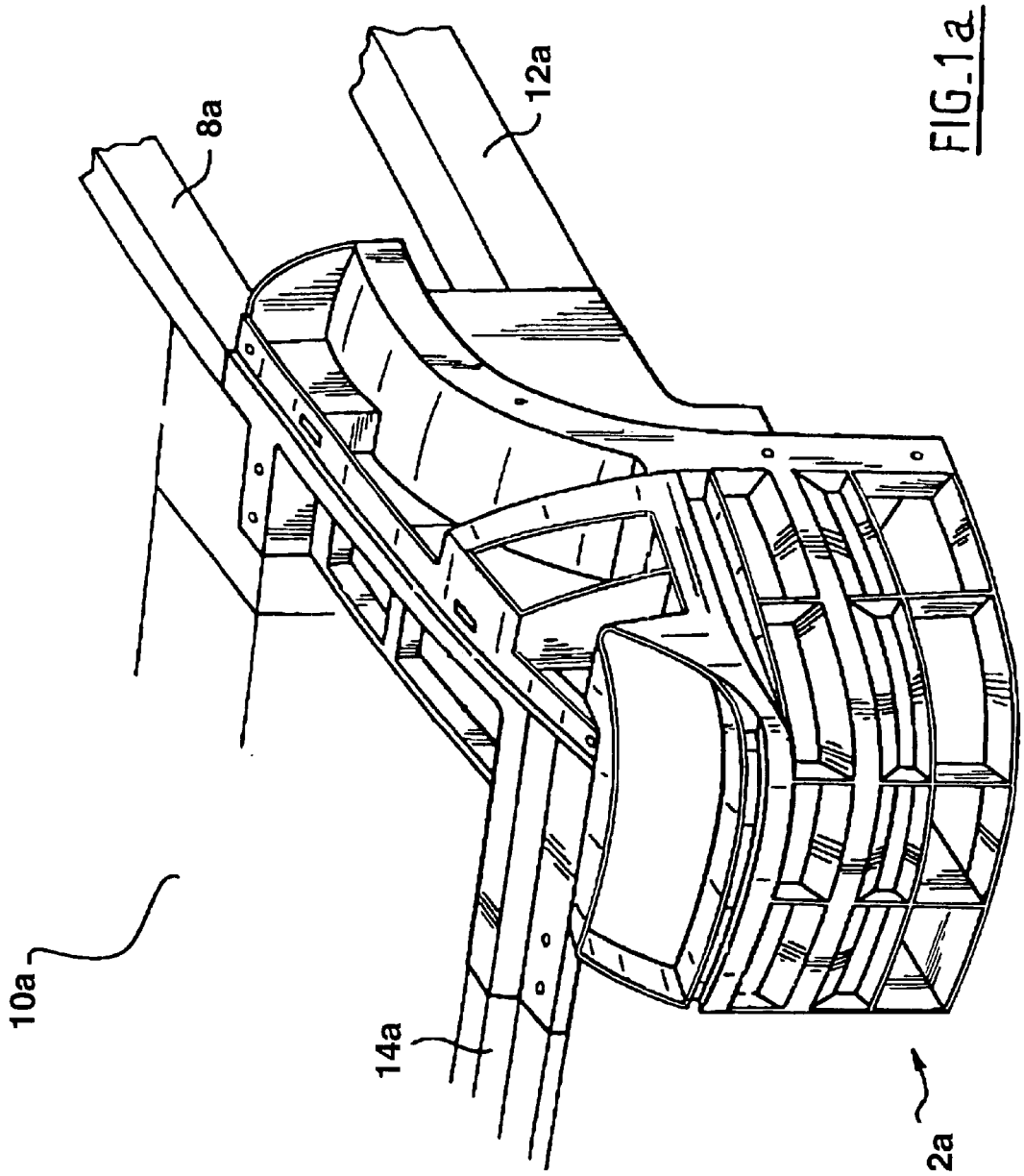
FIG. 1a is a perspective view of a front quarter of a vehicle.

In the embodiment shown in FIGS. 1 and 2, the frame of the light system is constituted by a reflective dish 14 which is mounted via self-releasing fastenings 19a, 19b to the structure of the vehicle, which structure is a front quarter 3 as described in the Applicant's French Patent published under No. 2 754 235.

Lamps 4, 5 mounted on the reflective dish 14 are constituted by a lenticular headlight 5 and a parabolic headlight 4 having a complex surface.

The reflective dish 14 forms the parabolic complex surface of the lamp 4 and surrounds the other lamp 5.

In this example, the lamp 4 is protected by a cover 4a, and the lamp 5 is protected by a cover 5a.

The back of the light system is closed off by a wall 15 that can be snap-fastened to the front quarter 3.

A light cover glass 16 closing off the light system is mounted on the front-quarter 3 by means of an intermediate piece 17 which glued by a bead of adhesive 18 to the periphery of the glass and which can be snap-fastened to a corresponding shape of the front quarter.

The intermediate piece 17 is provided with a tapered section 17a which makes it self-releasing so that, in the event of impact, the glass 16 can retreat into the vehicle after the intermediate piece 17 has been destroyed.

In the event of a small amount of deformation, the glass retreats without breaking and without reaching the remainder of the light system which remains in place.

In the event of a larger impact, the glass and the frame retreat into the vehicle, each retreating by means of the self-releasing fastenings 19a, 19b being destroyed.

One of said fastenings (19a) is fixed, while the other (19b) is adjustable, as explained below.

In this embodiment, the outer edge of the glass 16 overlaps the skin 10 of the bumper but the deformation capability of the bumper does not prevent the glass from retreating whenever necessary.

FIGS. 3 and 4 show an embodiment in which the frame is reduced to a plate 20 supporting the two lamps 4 and 5. The plate 20 is supported by a fixed fastening 19A and by an adjustable fastening 19b as above. The back of the light system is closed off by a wall 15 snap-fastened to the structure of the vehicle (front quarter 3).

FIG. 1a is a perspective view of a front quarter of a vehicle 10a. The front quarter may be a structural piece of a vehicle for supporting at least one element of the bodywork. The front quarter of the vehicle has an upper longitudinal member 8a and a lower longitudinal member 12a. The front quarter of the vehicle also has a bumper cross piece 2a and an upper cross piece 14a. The front quarter of the vehicle interconnects the upper longitudinal member 8a, the lower longitudinal member 12a, the bumper cross piece 2a and the upper cross piece 14a.

The front is closed off by a light cover glass 21 which is glued directly to the skin of the bumper, screen printing 24 is performed at the periphery of the glass in order to mask the bead of adhesive 23 that holds the glass against the bumper.

In order to guarantee that the parabolic complex surface lamp 4 is properly sealed, a second glass 25 is provided on the parabolic dish 26 surrounding the lamp. The dish 26 is supported directly by the plate 20.

FIGS. 5 to 17 show in detail the various component parts of an embodiment very similar to the embodiment shown in FIGS. 3 and 4.

Figure 5:
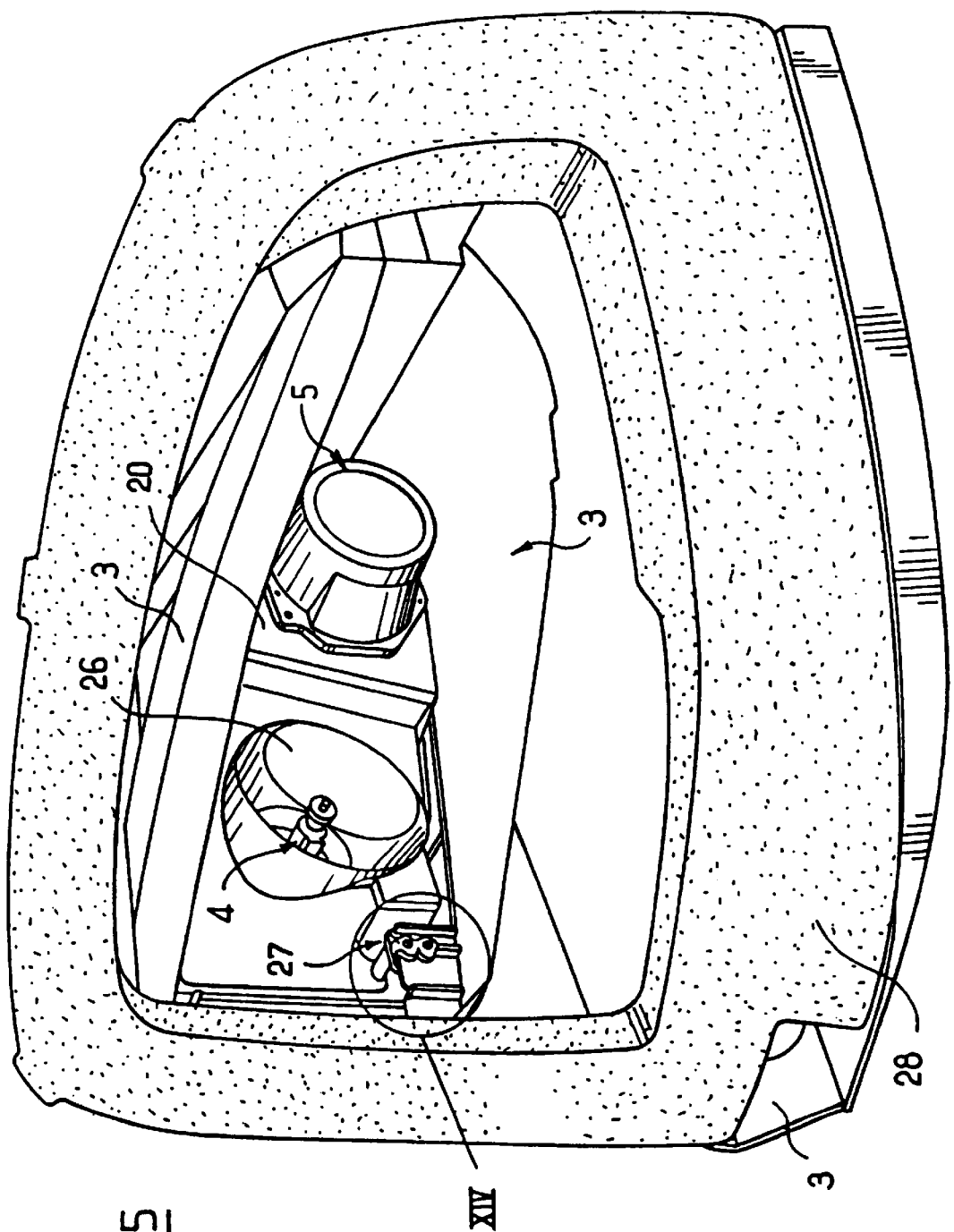
FIG. 5 is a perspective view of the right front portion of a motor vehicle provided with a light system very similar to the light system shown in FIGS. 3 and 4, with no bodywork piece.

FIG. 5 is a perspective view of the right front portion of a motor vehicle on which two lighting lamps 4 and 5 can be seen mounted on the plate 20 which is secured to the front quarter 3 of the vehicle by a snap-fastening system 27, a portion of which is shown in FIG. 5.

FIG. 5 also shows a molded block of foam 28 placed below the light unit and sealing the recess, also referred to as the "bowl", that contains the lamps.

Figure 6:
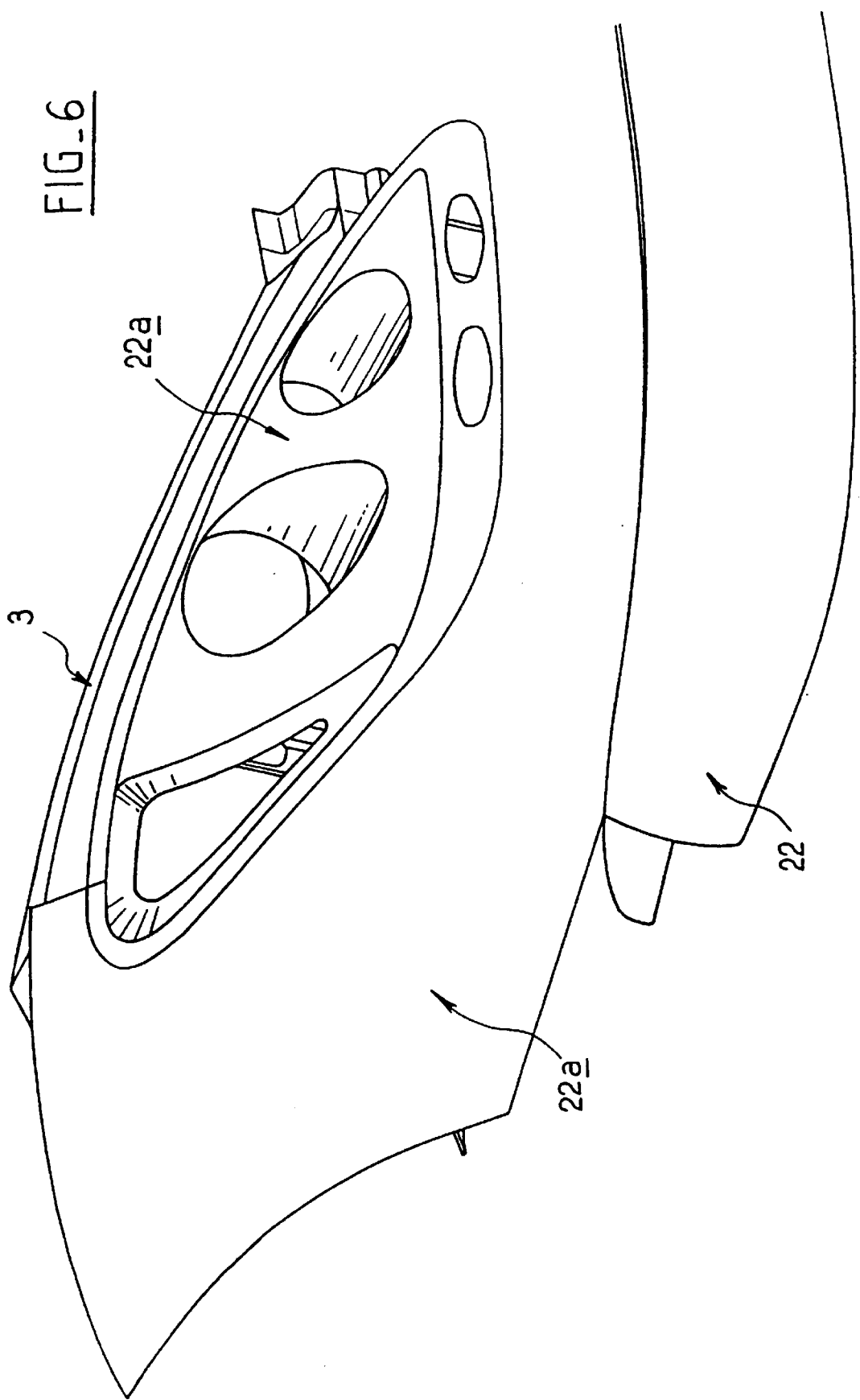
FIG. 6 is a view analogous to FIG. 5 of a bumper which is designed to overlap the portion of the vehicle shown in FIG. 5.

FIG. 6 is a view analogous to FIG. 5 of the bumper 22 which is designed to overlap the block of foam 28, to extend around the light by constituting a portion of the bodywork of the vehicle, and to extend into the light unit so as to outline the parabolic dish 26 and the front faces of the two lamps. Thus, the top portion 22a of the bumper constitutes an embellisher at the front of the lamps.

Figure 7:
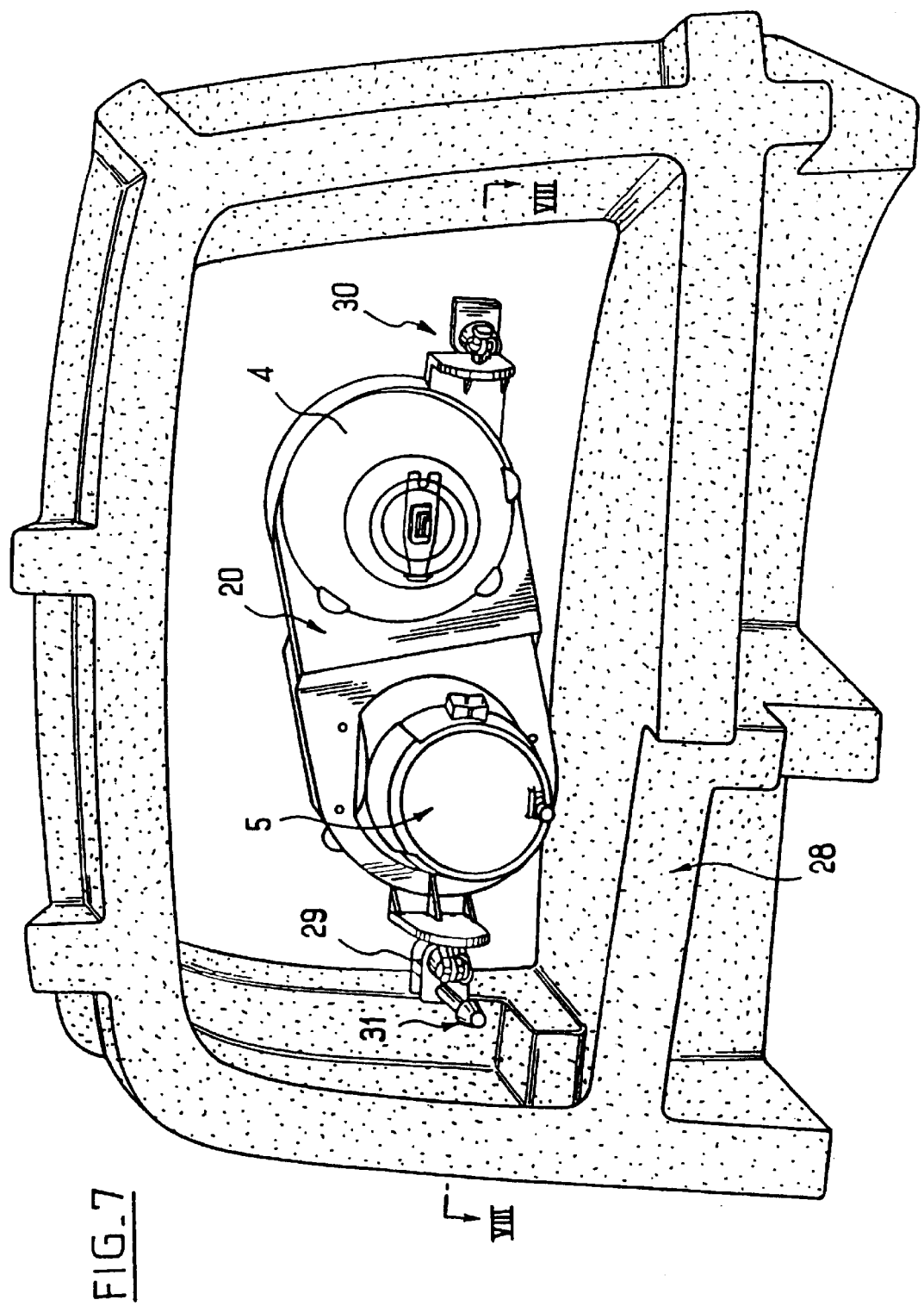
FIG. 7 is a perspective view of the back of the light system of FIG. 5.

FIG. 7 is a rear perspective view of the lighting system of FIG. 5, without the structure of the vehicle being shown.

FIG. 7 shows the block of foam 28 which is received in the bottom portion of the front quarter, and the plate 20 that supports the lamps 4, 5.

It also shows ball-fastenings 29 and 30 for fixing the plate, which ball-fastenings constitute the snap-fastening system 27 and are situated at either end of the plate.

Figure 8:
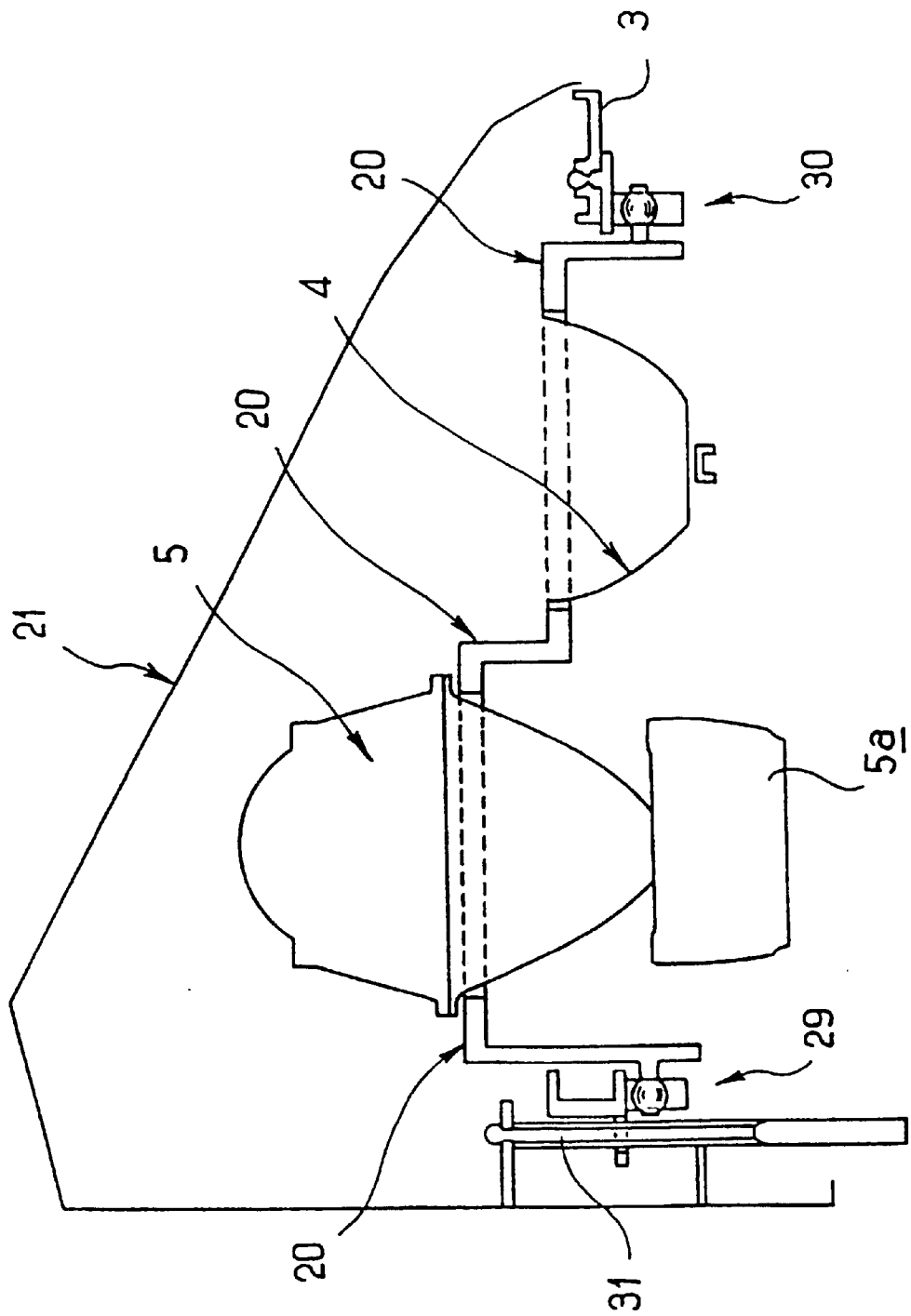
FIG. 8 is a section view on VIII—VIII of FIG. 7.

FIG. 8 is a section view on VIII—VIII of FIG. 7, showing, in particular, that while the ball-fastening 30 is fixed relative to the structure of the vehicle, the ball-fastening 29 is mounted to move forwards and backwards along a setting screw 31 which makes it possible to set the azimuth of light beams emitted by the lamps.

Figure 9:
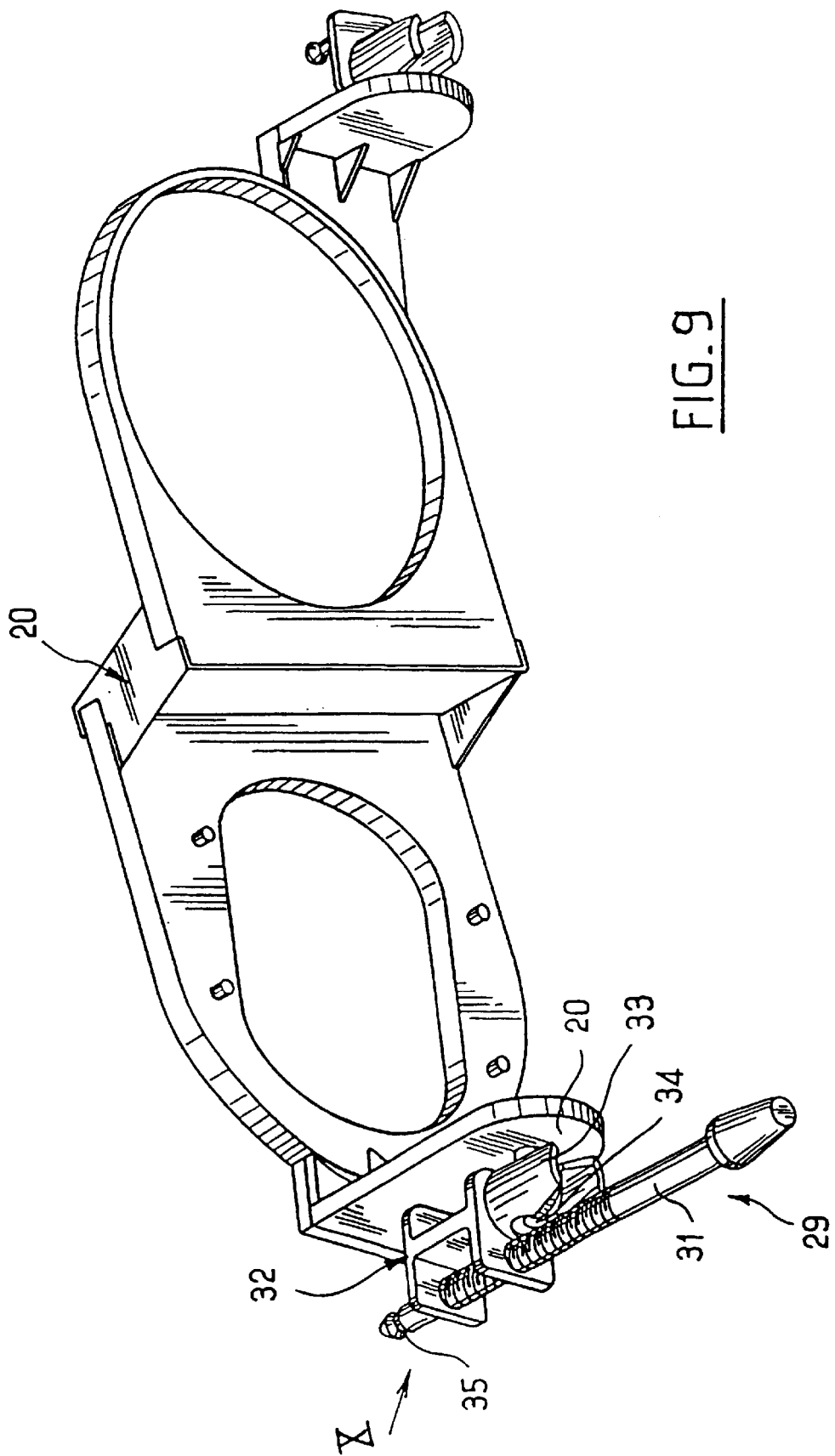
FIG. 9 is a rear perspective view of a portion of the light system of FIGS. 5 to 8.

FIG. 9 is a rear perspective view of the bare plate 20 and of its ball-fastening 29 that can be adjusted by moving along the setting screw 31 which is provided with a thread along which a guide carriage 32 can slide forwards and backwards, said carriage supporting the female portion 33 of the ball-fastening while the male portion 34 is secured to or integral with the plate 20.

The male portion 34 and the female portion 33 of the ball-fastening are secured together by snap-fastening.

The front end of the setting screw 31 is provided with a snap-fastening head 35 for the purpose of fixing it to the front quarter 3, in a snap-fastening orifice (not shown).

It should be noted that the two snap-fastening systems provided between firstly the male and female portions of the ball-fastening an secondly the head 35 of the screw and the front quarter, are angularly positioned so as to enable the plate to retreat towards the rear of the vehicle by means of the snap-fastened pieces being released.

Figure 10:
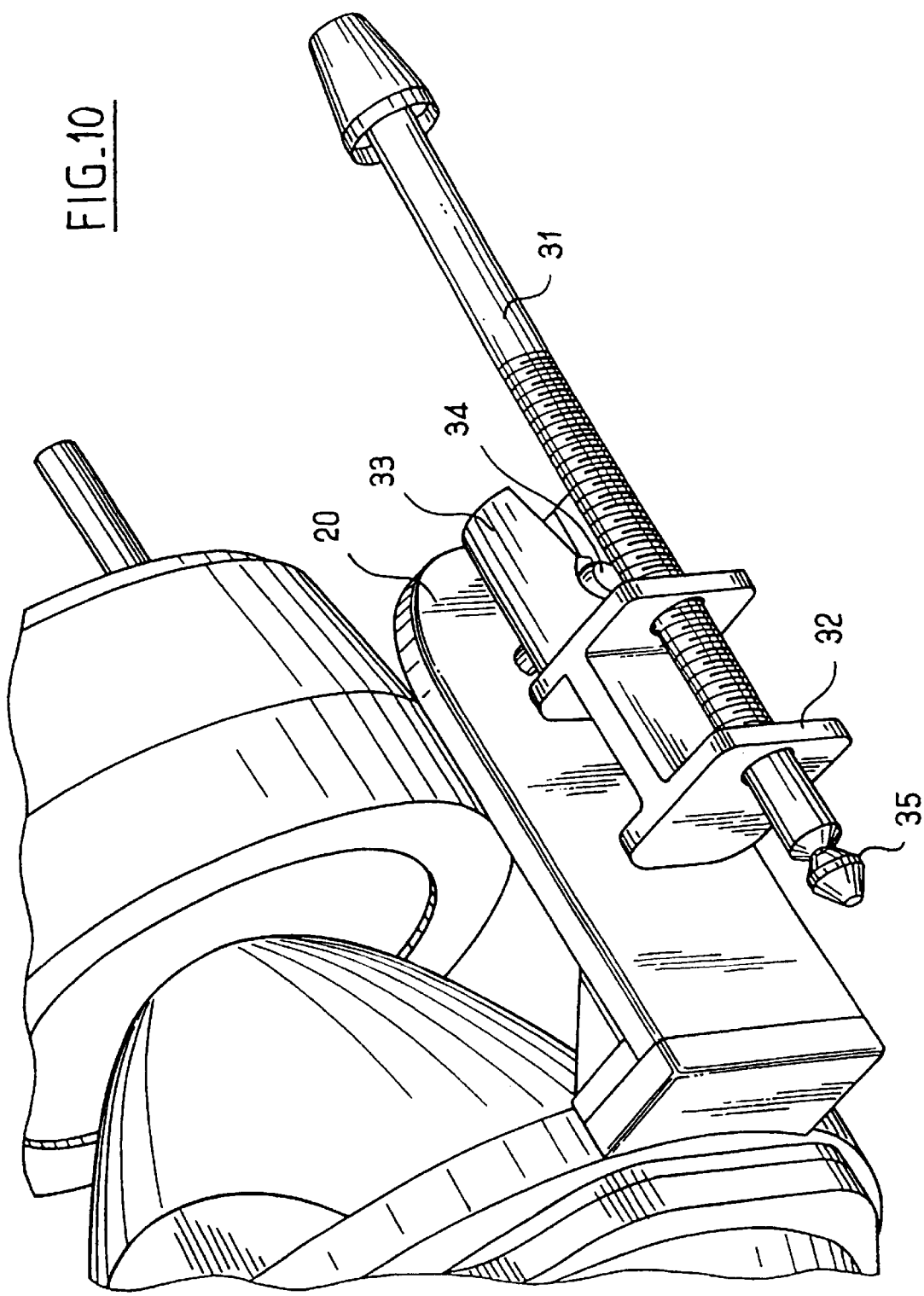
FIG. 10 is a view on a larger scale looking along arrow X of FIG. 9.

FIG. 10 shows the ball-fastening 33, 34, the carriage 32, and the setting screw 31 on a larger scale.

Figure 11:
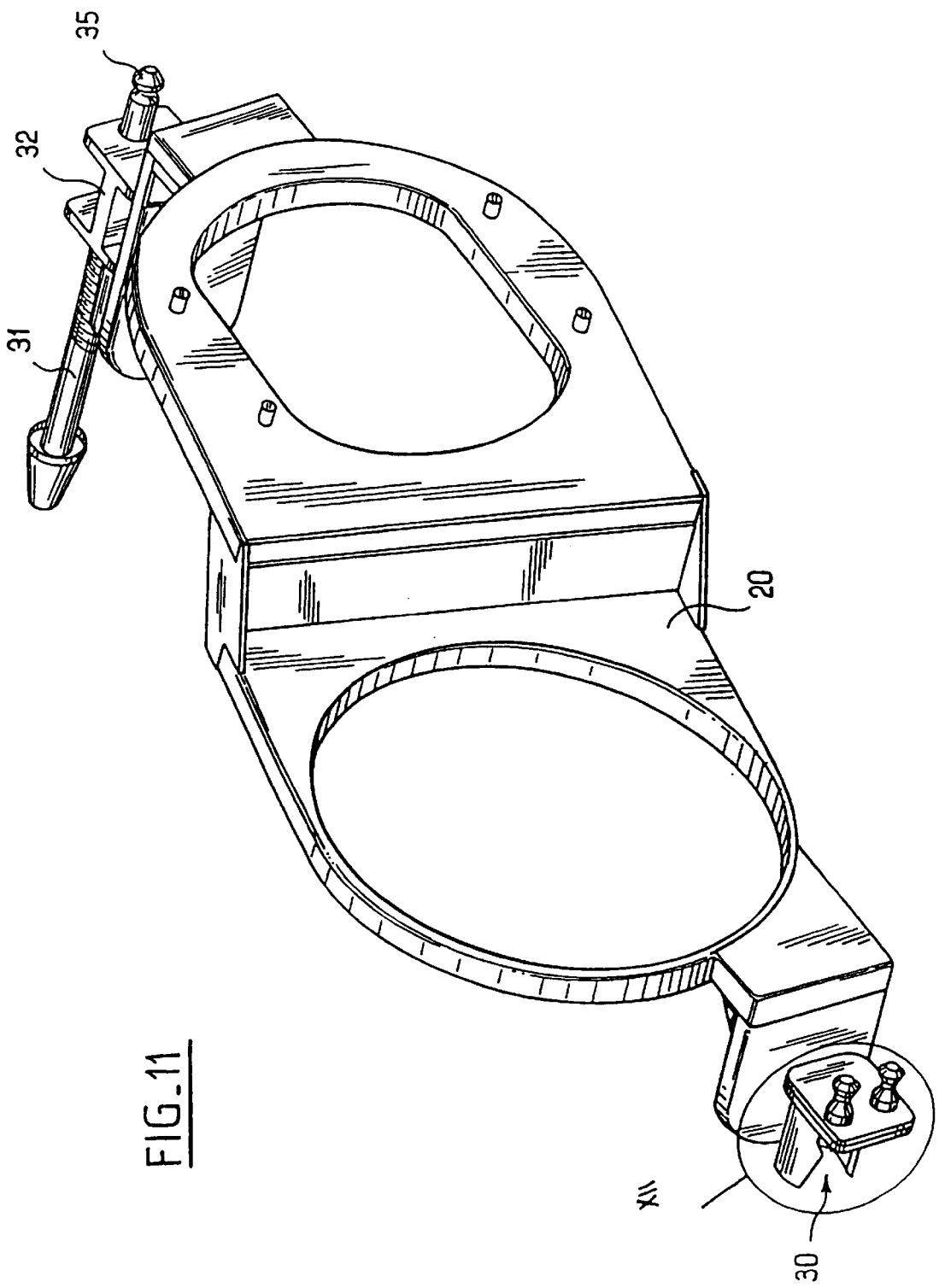
FIG. 11 is a front perspective view of a portion of the light system of FIGS. 5 to 10.

FIG. 11 is a front perspective view of the bare plate. This figure shows the fixed ball-fastening 30 in addition to the adjustable ball-fastening 29.

Figure 12:
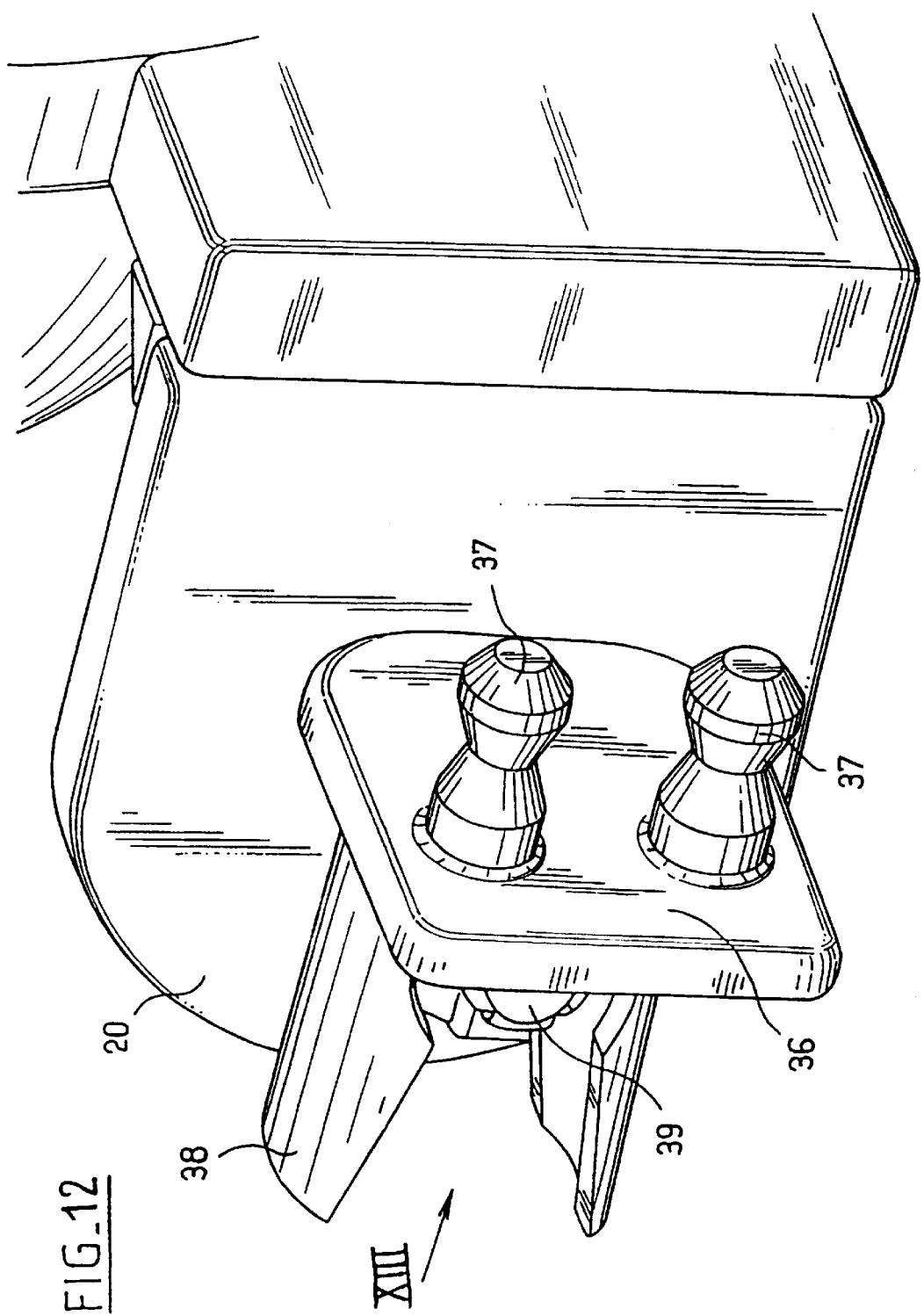
FIG. 12 is a view on a larger scale of the portion XII of FIG. 11.
Figure 13:
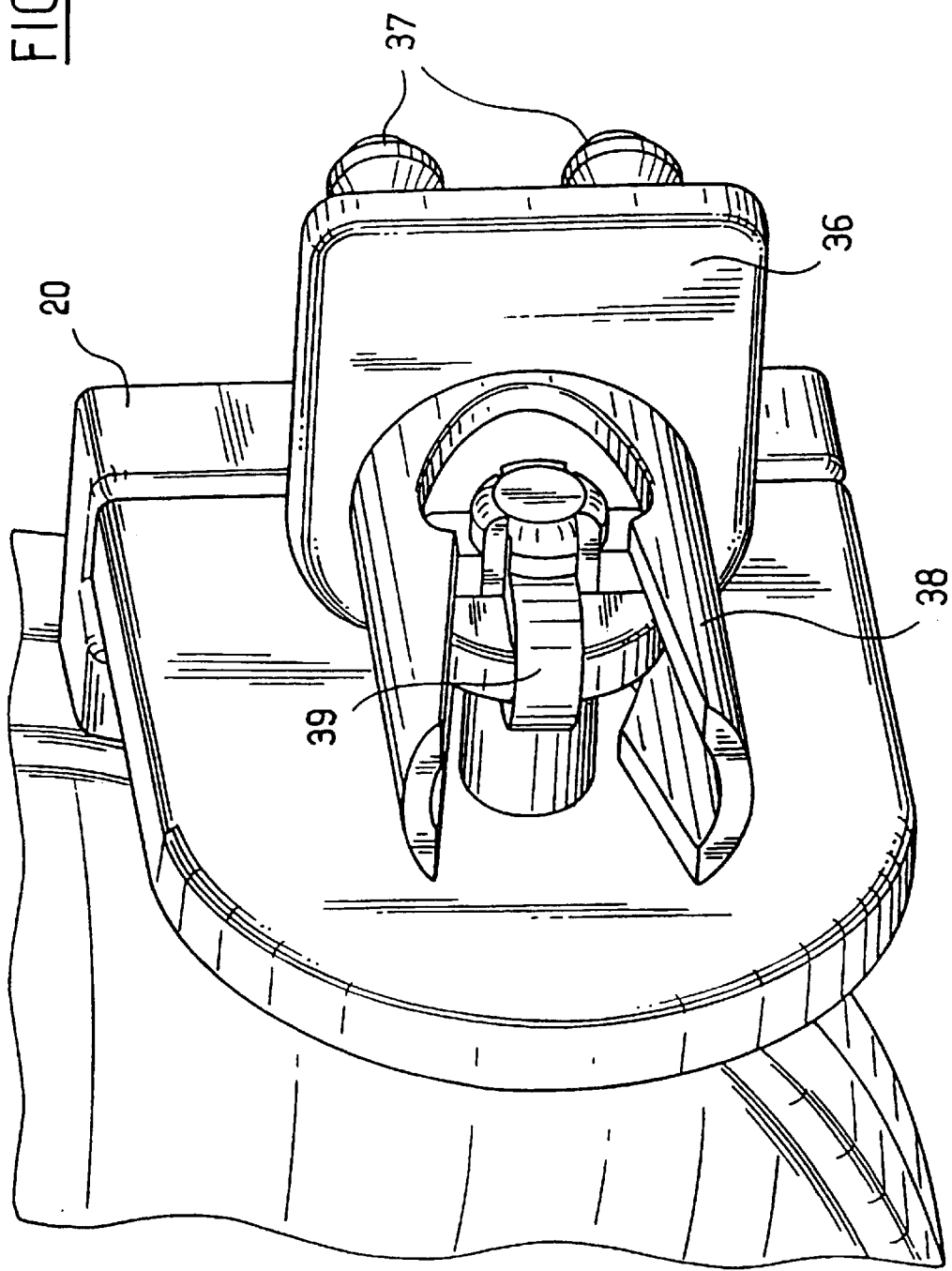
FIG. 13 is a view looking along arrow XIII of FIG. 12.
Figure 14:
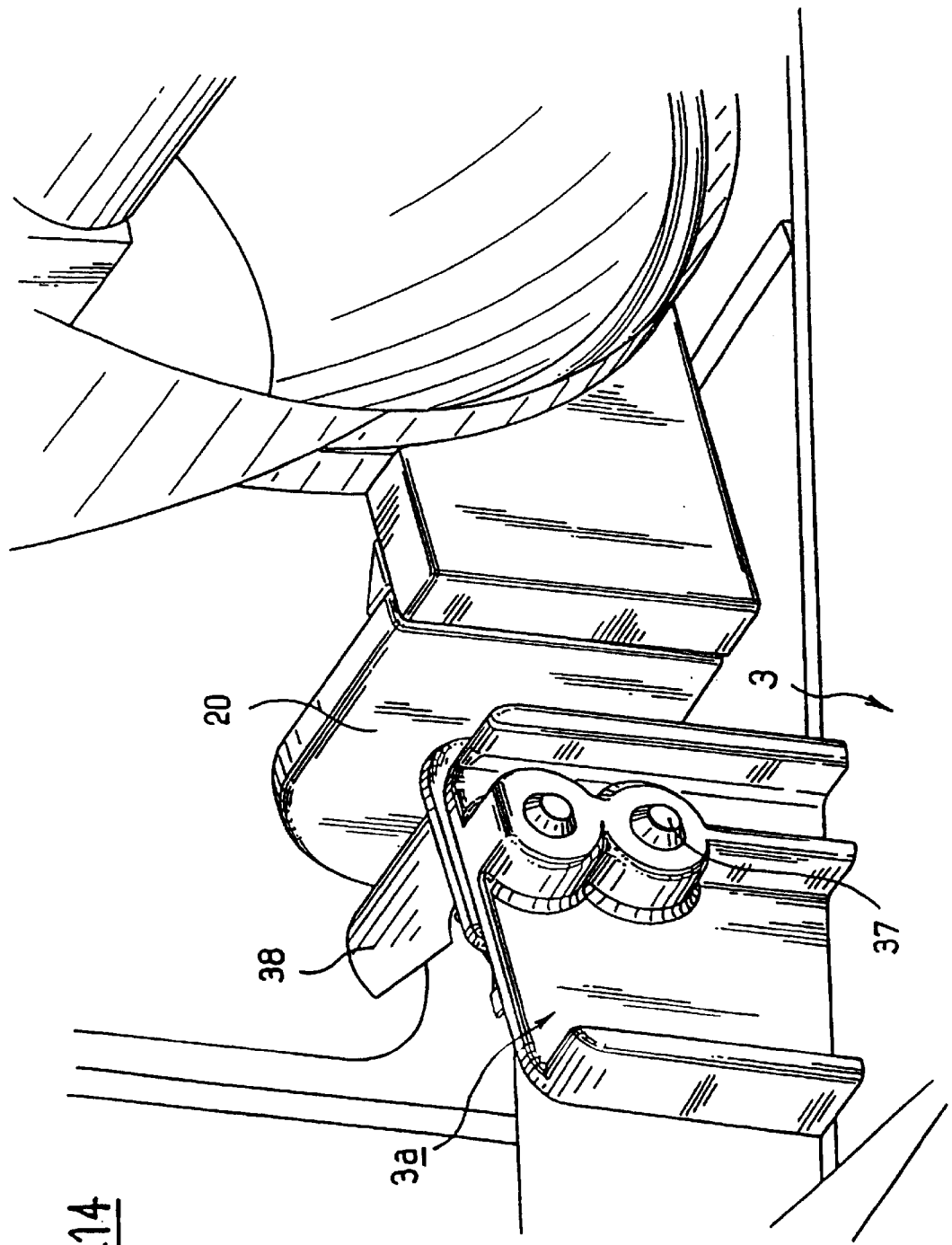
FIG. 14 is a view on a larger scale of the portion XIV of FIG. 5.

This fixed ball-fastening can be seen more clearly in the close-up views of FIGS. 12, 13, and 14 which show that a ball-fastening support 36 is provided with two snap-fastening or clipping heads 37 for fixing it to the front quarter of the vehicle in notches provided in a projecting portion 3a of the front quarter 3. The ball-fastening support 36 includes the female portion 38 of the ball-fastening, which portion can be snap-fastened to the male portion 39 which is integral with the plate 20.

Figure 15:
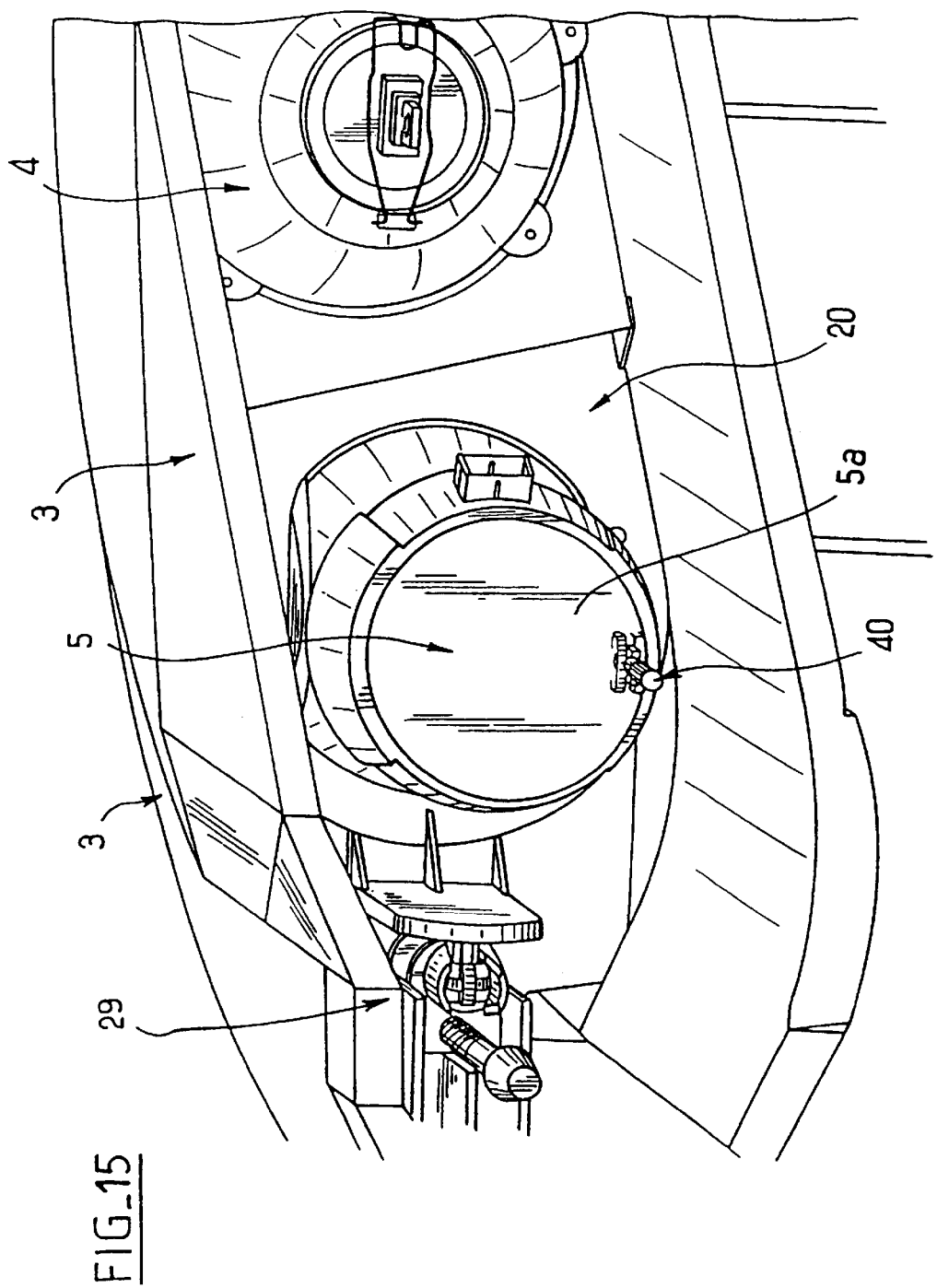
FIG. 15 is a rear perspective view of the same light system as mounted on the vehicle.
Figure 16:
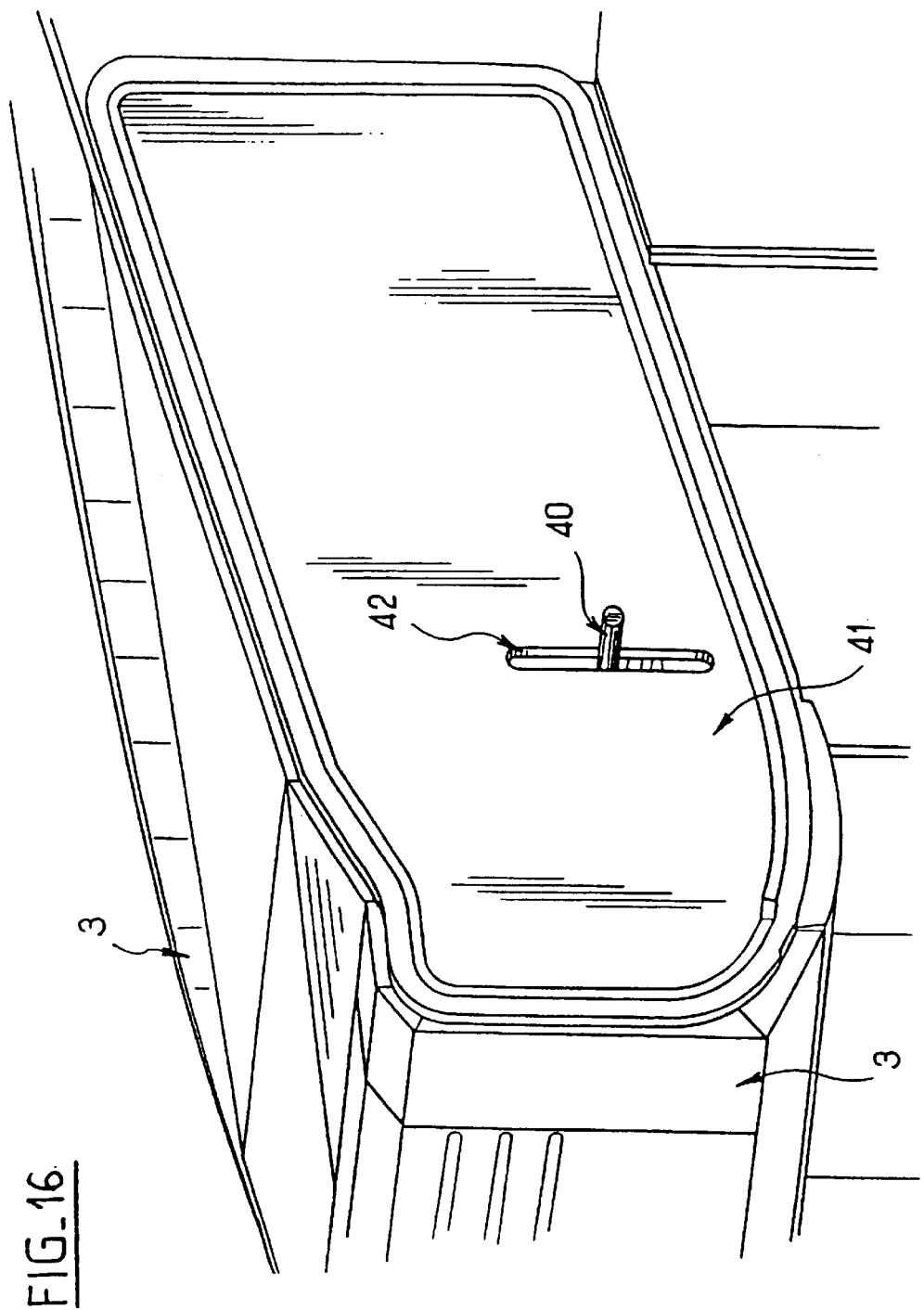
FIG. 16 is a view analogous to FIG. 15, after the bowl receiving the light system has been closed.
Figure 17:
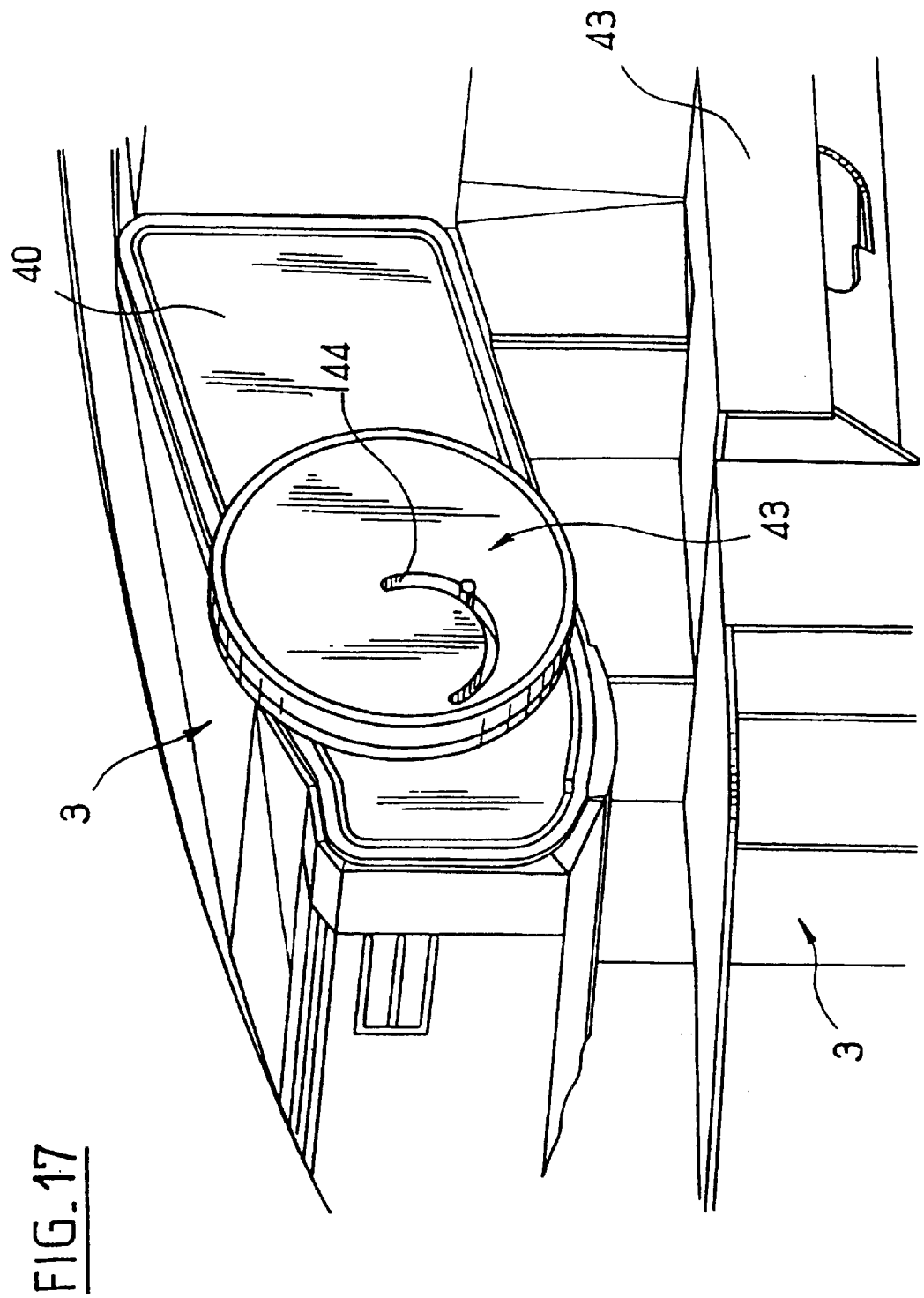
FIG. 17 is a view analogous to FIG. 16, after a an elevation-setting knurled wheel has been installed.

The elevation of the lighting system is adjusted by means of an elevation-setting rod 40 secured to the rear cover 5a of the lenticular headlight 5, as shown in FIG. 15. This elevation-setting rod 40 engages in a vertical guide slot 42 provided in the rear sealing cap 41 of the light unit (FIG. 16), on which cap a setting knurled wheel 43 is mounted to rotate, which wheel is provided with a circular guide slot 44 in which the elevation-setting rod also penetrates, as shown in FIG. 17. It can be understood that by turning the elevation-setting wheel 43, the elevation-setting rod 40 is caused to move up or down, thereby modifying the angular position of the plate about an axis passing through both of the ball-fastenings.

It should be noted that the various snap-fastening means that are provided for fixing the plate to the structure of the vehicle are all angularly positioned such that, in the event that an impact imparts a force directed towards the rear of the vehicle to the light unit, the various snap-fastened parts can come apart without breaking.

The setting systems described with reference to FIGS. 5 to 17 can be applied to all of the embodiments.

FIG. 18 shows a frame analogous to that of FIGS. 1 and 2, except that the reflective dish 45 is provided with a cover glass made of polycarbonate 46 which provides first means for closing off the light housing.

A second cover glass 47 is secured to the bumper 48 by snap-fastening, as shown in the detail view of FIG. 19, by means of an intermediate piece 49 glued to the periphery of the glass and shaped to snap-fasten to the bumper.

A gasket 50 separates the glass 47 from the bumper 48.

Figure 20:
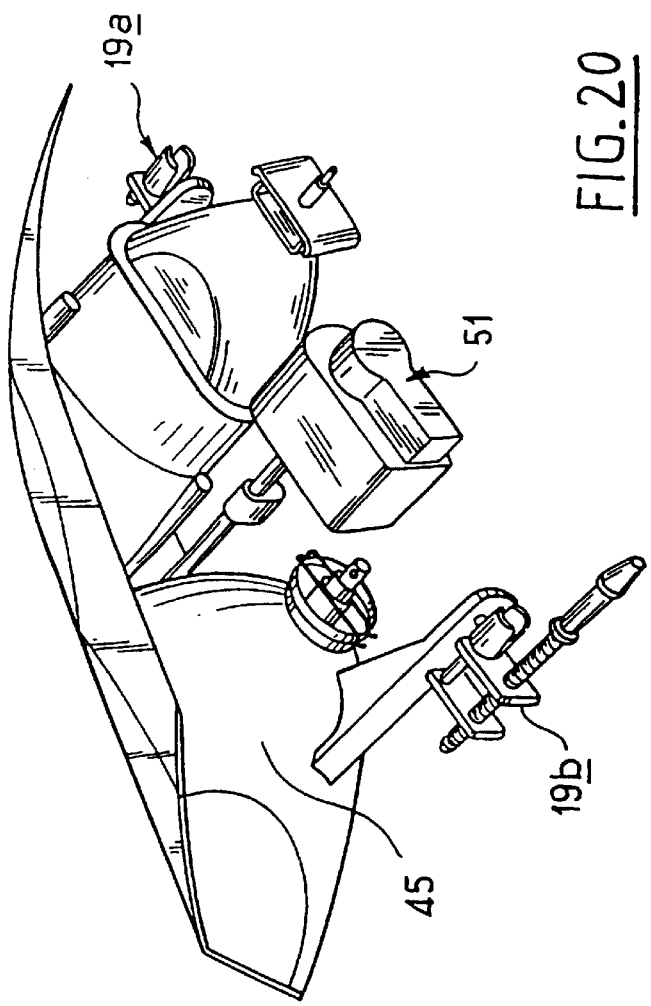
FIG. 20 is a rear perspective view of the light system of FIG. 18.

FIG. 20 shows a rear perspective view of the dish 45 of the lamps and of the adjustable fastenings 19a and 19b. An elevation-setting motor 51 is also shown.

Figure 21:
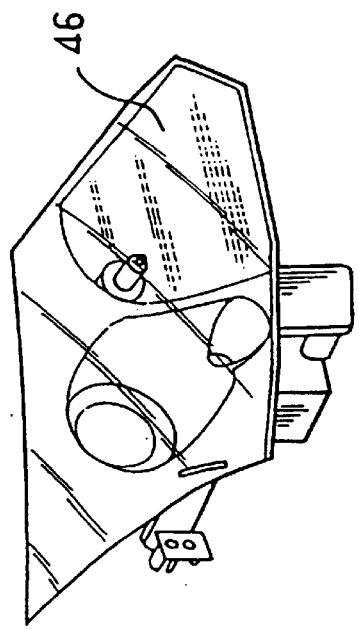
FIG. 21 is a front perspective view of the light system of FIG. 18.

The front perspective view given in FIG. 21 shows the polycarbonate cover glass 46 as glued directly to the dish 45.

FIG. 22 shows an embodiment in which the frame is constituted by a plate 61.

The lamp 4 having a complex parabolic surface is provided with a parabolic dish 62 secured to the plate.

The lenticular headlight 5 is provided with a peripheral mask 63 which is also secured to the plate 61.

A protective cover glass 64 is mounted independently of the frame 61, by being glued directly to the skin of the bumper, as shown in FIG. 34.

In order to seal the bowl containing the light system, the cover glass is provided with a skirt 65 which extends towards the inside of the vehicle to the vicinity of the front edge 66 of the bowl, which edge is provided with a shape that is complementary to the shape of the end 67 of the skirt.

A compressible gasket 68 of the flexible tube type is interposed between these two complementary shapes by being secured to the edge 66 of the bowl.

Figure 25:
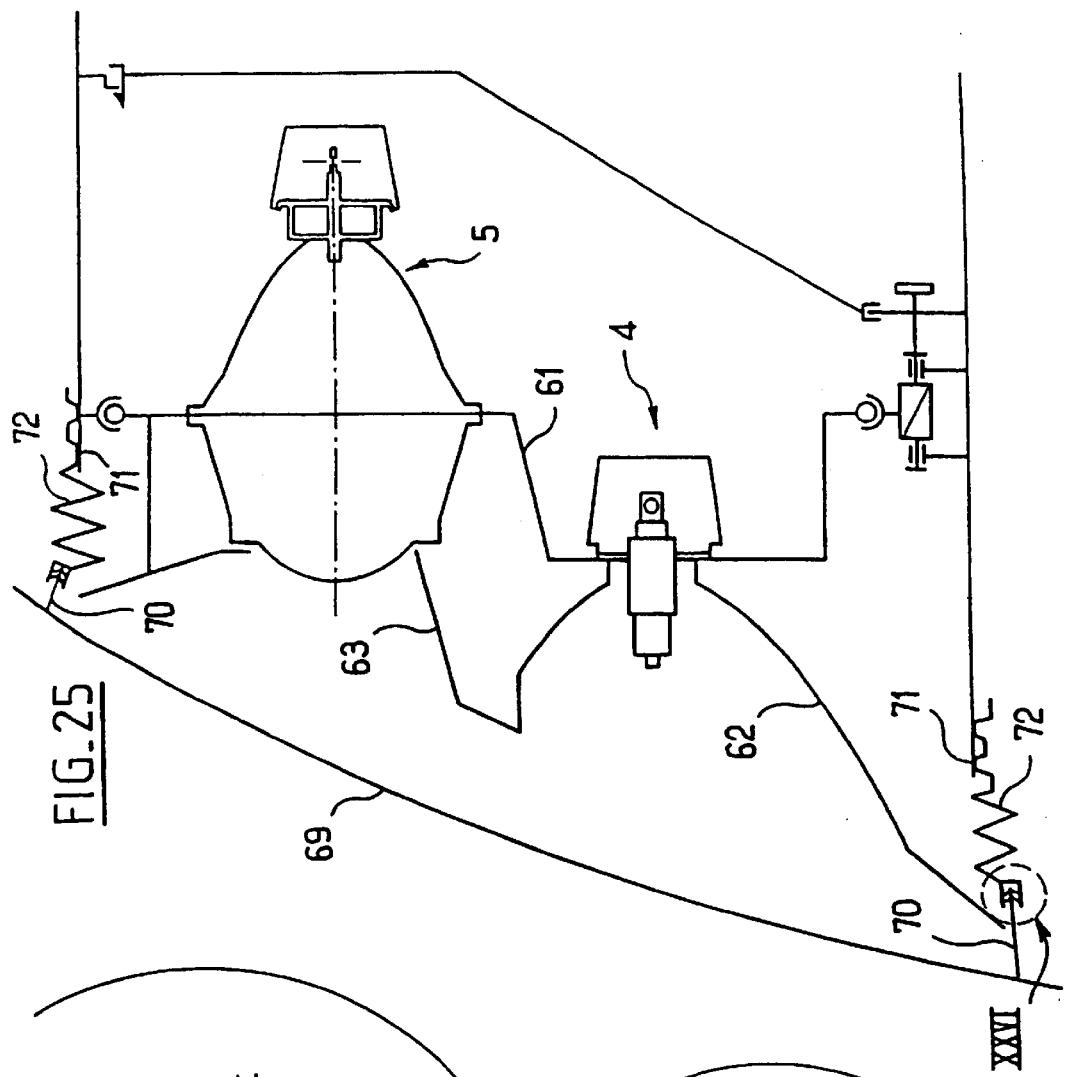
FIG. 25 is a view analogous to FIGS. 1, 3, 18 and 22 of another embodiment of the invention.
Figure 27:
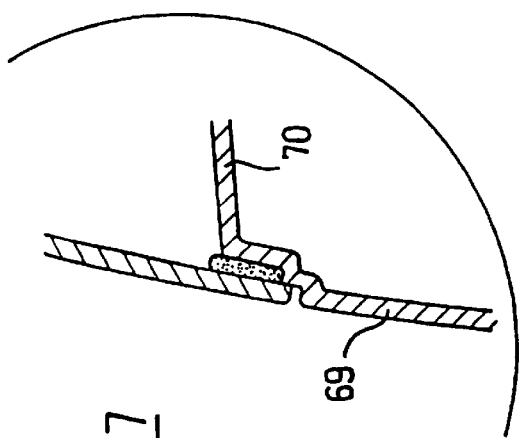
FIG. 27 is a view on a larger scale of the portion XXVII of FIG. 25.
Figure 26:
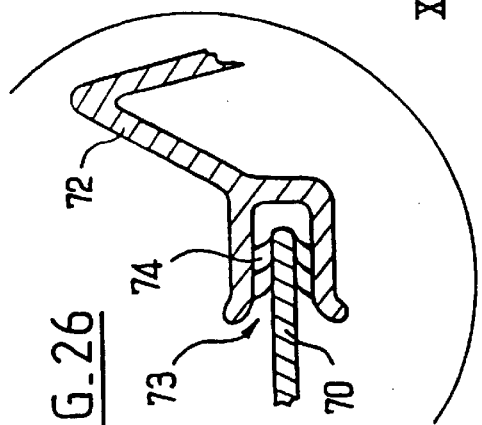
FIG. 26 is a view on a larger scale of the portion XXVI of FIG. 25.

The embodiment shown in FIGS. 25 to 27 differs from the preceding embodiment only by the protective cover glass 69 which is provided with a skirt 70 that is shorter and that does not extend to the front edge of the bowl.

In order to seal the bowl, it is extended towards the cover glass 69 by a bellows 72 which surrounds the edge 71 of the bowl and extends to the skirt 70, against which skirt it abuts by means of a peripheral bead 73 lined with a gasket 74 and in which the end of the skirt 70 is received.

The bowl containing the light system is thus sealed properly.

Naturally, the above-described embodiments are in no way limiting, and they can undergo any desirable modification without going beyond the ambit of the invention.

What is claimed is:

1. A lighting system for a motor vehicle, said vehicle having a bodywork, said system comprising:
   a structural piece of the vehicle supporting at least one element of the bodywork, said structural piece further defining a housing, said housing containing a frame, said frame supporting at least one lighting lamp.

2. A lighting system according to claim 1, wherein the structural piece is a front quarter.

3. A lighting system according to claim 1, wherein said vehicle comprises an upper longitudinal member, a lower longitudinal member, a bumper crosspiece and an upper crosspiece and wherein said structural piece interconnects the upper longitudinal member, the lower longitudinal member, the bumper crosspiece and the upper crosspiece.

4. A lighting system according to claim 1, wherein the frame has a reflective surface associated with said lamp and configured to concentrate light rays emitted by said lamp.

5. A lighting system according to claim 1, wherein the frame is deprived of any reflective surface for concentrating light rays emitted by said lamp.

6. A lighting system according to claim 1, wherein the frame is integrally molded.

7. A lighting system according to claim 1, wherein the lighting system includes a sealing member which extends between the housing and the bodywork and prevents dust, water, and any foreign particles from penetrating into said housing.

8. A lighting system according to claim 7, wherein the sealing member comprises a molded block of foam which allows air to flow therethrough.

9. A lighting system according to claim 8, wherein the block of foam is configured to provide an energy-absorption function.

10. A lighting system according to claim 8, wherein the block of foam surrounds said housing.

11. A lighting system according to claim 1, comprising a transparent cover placed in front of said frame and a compressible gasket positioned at a periphery of a front edge of said housing and bearing against one of said bodywork and said cover.

12. A lighting system according to claim 1, comprising a transparent cover placed in front of said frame and a bellows which abuts against at least one of the bodywork and said cover and which encloses a front edge of said housing.

13. A lighting system according to claim 1, wherein said system comprises at least one self-releasing fastening connecting the frame to the structural piece and configured such that in the event that the vehicle is subjected to an impact, the frame is allowed to retreat relative to the structural piece.

14. A lighting system according to claim 13, wherein said at least one self-releasing fastening comprises snap-fastening members.

15. A lighting system according to claim 1, wherein the frame is provided with a setting member allowing setting of elevation and azimuth of a light beam emitted by the at least one lighting lamp.

16. A lighting system according to claim 15, wherein the frame comprises two ball-fastenings, one of which is fixed, while the other is mounted to move forwards and backwards, thereby enabling the frame to be pivoted about a vertical axis to set the azimuth of the light beam, while the elevation can be set by pivoting the frame about a substantially horizontal axis passing through both of said ball-fastenings.

17. A lighting system according to claim 16, wherein said ball-fastenings each have male and female portions that snap-fasten together.

18. A lighting system according to claim 1, wherein the lighting system comprises a protective transparent cover separated from the frame and secured to at least one of the bodywork and the structural piece, in front of said frame.

19. A lighting system according to claim 18, wherein the cover is glued directly to the bodywork.

20. A lighting system according to claim 18, wherein the cover is secured to at least one of the bodywork and the structural piece via an intermediate piece which includes a frangible portion which makes it possible, in the event of impact, for the cover to retreat by destroying said frangible portion.

21. A lighting system according to claim 18, wherein the cover has snap-fastening shapes which cooperate with corresponding shapes on the bodywork, enabling the cover to be snap-fastened to the bodywork.

22. A lighting system according to claim 1, wherein said housing comprises a bowl-shaped recess that can receive said frame.

23. A lighting system according to claim 5, wherein said frame supports a reflective dish for concentrating the light rays emitted by said at least one lamp.

24. A lighting system according to claim 1, comprising a protective transparent cover placed in front of said frame, wherein, between said housing and said protective cover, the lighting system includes a sealing member which prevents dust, water, and any foreign particles from penetrating into said housing.

25. A lighting system according to claim 11, wherein said compressible gasket comprises a flexible tube.

26. A lighting system according to claim 1, wherein said lighting system has a back aperture and a cap closing said back aperture, wherein said lighting system has an elevation-setting rod and wherein said cap has a slot for receiving said rod.

27. A lighting system according to claim 1, wherein said structural piece supports at least one part of the vehicle other than an element of the bodywork.

28. A lighting system according to claim 20, wherein said intermediate piece has a front portion and a back portion connected to said front portion via said frangible portion and wherein said frangible portion has a thickness smaller than a thickness of said front or back portions.

29. A lighting system according to claim 28, wherein said frangible portion is inclined relative to said front and back portions.

30. A lighting system according to claim 4, wherein said reflective surface comprises a substantially parabolic surface.

31. A lighting system according to claim 4, wherein said frame supports a further lamp other than the lamp associated with said reflective surface.

32. A lighting system according to claim 1, wherein said housing has a front aperture and a back aperture, and wherein said lighting system comprises a wall separated from said frame for closing off said back aperture.

33. A lighting system according to claim 32, wherein said wall is snap-fastened to said structural piece.

34. A lighting system according to claim 1, comprising a transparent cover separated from the frame and situated in front thereof, said cover being configured to be capable of retreating relative to said frame in the event of impact.

35. A lighting system according to claim 1, said system further comprising:
a transparent cover situated in front of said frame, said cover comprising a front face and a skirt which is connected to said front face at a portion thereof spaced apart from a border of said front face and which extends towards said frame, wherein said structural piece has a front edge and said skirt has a back edge, said front and back edges being in the vicinity of each other and having complementary shapes.

* * * * *